US011699911B2

(12) United States Patent
Sorias

(10) Patent No.: US 11,699,911 B2
(45) Date of Patent: Jul. 11, 2023

(54) SMART CHARGER WITH BUILT IN CONNECTOR

(71) Applicant: Yeoshua Sorias, Brooklyn, NY (US)

(72) Inventor: Yeoshua Sorias, Brooklyn, NY (US)

(*) Notice: Subject to any disclaimer, the term of this patent is extended or adjusted under 35 U.S.C. 154(b) by 317 days.

(21) Appl. No.: 16/898,438

(22) Filed: Jun. 11, 2020

(65) Prior Publication Data
US 2020/0395767 A1 Dec. 17, 2020

Related U.S. Application Data

(60) Provisional application No. 62/861,472, filed on Jun. 14, 2019.

(51) Int. Cl.
H02J 7/00 (2006.01)
H01R 35/04 (2006.01)
H01R 31/06 (2006.01)
H02J 50/10 (2016.01)

(52) U.S. Cl.
CPC .......... *H02J 7/0042* (2013.01); *H01R 31/06* (2013.01); *H01R 35/04* (2013.01); *H02J 50/10* (2016.02)

(58) Field of Classification Search
CPC .......... H02J 7/0042; H02J 50/10; H01R 31/06
USPC ........................................................ 320/108
See application file for complete search history.

(56) References Cited

U.S. PATENT DOCUMENTS

| 9,088,670 | B2 | 7/2015 | Sorias et al. |
| 9,130,384 | B2 | 9/2015 | Pliner et al. |
| 9,413,179 | B2 | 8/2016 | Sorias et al. |
| 9,977,462 | B2 | 5/2018 | Sorias et al. |
| 10,084,300 | B1* | 9/2018 | Glahe ................... F16M 13/02 |
| 2006/0049922 | A1* | 3/2006 | Kolpasky ............. B60R 25/257 340/426.13 |
| 2012/0126956 | A1* | 5/2012 | Trzecieski ............. G08C 17/00 340/12.5 |
| 2016/0322853 | A1* | 11/2016 | Porat ...................... H02J 50/12 |
| 2017/0110898 | A1* | 4/2017 | Kyriakoulis .......... H02J 7/0042 |
| 2017/0133874 | A1* | 5/2017 | Loewen ................ H02J 7/0044 |
| 2018/0069358 | A1* | 3/2018 | Miller .................... H02J 50/10 |
| 2018/0102654 | A1* | 4/2018 | Miller ....................... A45F 5/02 |
| 2018/0102655 | A1* | 4/2018 | Miller ....................... F21V 3/00 |
| 2020/0112205 | A1* | 4/2020 | Weisband .............. H02J 7/342 |
| 2020/0280199 | A1* | 9/2020 | Lopotko ................ H01R 35/02 |
| 2020/0410793 | A1* | 12/2020 | Folco ................ G06Q 30/0645 |
| 2021/0036537 | A1* | 2/2021 | Yang .................... H02J 7/0045 |
| 2021/0184411 | A1* | 6/2021 | Grau ..................... H01R 35/02 |
| 2022/0069595 | A1* | 3/2022 | Yu ......................... G06F 1/1628 |
| 2022/0239124 | A1* | 7/2022 | Aurongzeb ........... H02J 50/10 |

* cited by examiner

*Primary Examiner* — Suchin Parihar

(74) *Attorney, Agent, or Firm* — Ostrolenk Faber LLP

(57) ABSTRACT

A wireless charger for charging a battery of a mobile device includes a housing configured to be coupled to a source of electrical energy, for receiving electrical energy the source of electrical energy and for converting at least a portion of the electrical energy to radiated electrical energy; a USB connector mounted directly to housing and configured to be plugged into an electrical socket of said source of electrical energy. A plurality of magnets are embedded or affixed to the housing and configured to magnetically attract ferromagnetic material associated with a mobile device, to hold and support the mobile device on or to a support surface of the housing.

14 Claims, 4 Drawing Sheets

SMART CHARGER WITH BUILT IN CONNECTOR

CROSS-REFERENCE TO RELATED APPLICATION

The present non-provisional patent application claims the benefit of and priority to U.S. Provisional Patent Application No. 62/861,472, filed Jun. 14, 2019, by Yeoshua Sorias, and entitled "SMART CHARGER WITH BUILT IN CONNECTOR," the entire contents of which is incorporated herein by reference.

BACKGROUND OF THE INVENTION

The present invention is generally directed to battery chargers, optionally with an included auxiliary battery and, more particularly, to universal battery chargers for cell phones and like mobile devices that can be utilized with many different cell phone devices and which do not use any dangling cable components.

For background purposes, the inventor refers to his prior issued patents including U.S. Pat. Nos. 9,977,462, 9,413,179 and 9,088,670, the entire contents of which are incorporated by reference herein. The background art is also described in U.S. Pat. No. 9,130,384 and the entire contents of U.S. Pat. No. 9,130,384 are also incorporated by reference herein.

In general, the present invention utilizes Qi chargers that charge batteries wirelessly. In the prior art, the basic Qi chargers receive their electrical power via dangling electrical cables, which pose the problem of these cables becoming entangled inside men's and women's carrying cases, and constituting an extra component to carry around and pay for.

SUMMARY OF THE INVENTION

Thus, the present invention relates to the so-called "Qi" chargers that are wireless chargers that use an open interface standard that defines wireless power transfer using inductive charging over distances of up to 4 cm (1.6 inches), with the objective that they operate without power cord and provide support to mobile devices, e.g., phones, requiring to be recharged.

As is well known, devices that operate with the Qi standard rely on electromagnetic induction between planar coils. A Qi system consists of two types of devices the base station, which is connected to a power source and provides inductive power, and mobile Devices, which consume inductive power. The base station contains a power transmitter that comprises a transmitting coil that generates an oscillating magnetic field. The Mobile Device contains a power receiver holding a receiving coil. The magnetic field induces an alternating current in the receiving coil by Faraday's law of induction. Close spacing of the two coils, as well as shielding on their surfaces, ensure the inductive power transfer is efficient.

Base Stations typically have a flat surface referred to as the Interface Surface on top of which a user can place one or more Mobile Devices. There are two methods for aligning the transmitting coil (part of the Base Station) and receiving coil (part of the Mobile Device) in order for a power transfer to happen. In the first concept called guided positioning a user must place the Mobile Device on a certain location of the Base Station's surface. For this purpose, the Mobile Device provides an alignment aid that is appropriate to its size, shape and function. The second concept referred to as free positioning does not require the user to place the Mobile Device in direct alignment with the transmitting coil. There are several ways to achieve free positioning. In one example a bundle of transmitting coils is used to generate a magnetic field at the location of the receiving coil only. Another example uses mechanical means to move a single transmitting coil underneath the receiving coil. A third option is to use a technique called "Multiple Cooperative Flux Generators."

In accordance with an embodiment of the present invention, an otherwise conventional Qi Charger is modified to include a built in USP plug, preferably one that is pivot-ably coupled to the body of the Qi charger. In accordance with a further embodiment of the present invention, the body of the Qi charger incorporate several magnets that are interspersed over the body of the Qi charger, on the side thereof against which the mobile devices is intended to rest during charging. The case of the mobile device has attached thereto ferromagnetic thin sheet that strongly adhere to the magnets in the Qi charger, and thereby held firmly to it during charging cycles.

In accordance with preferred embodiments, the present invention is directed to a wireless charger for charging a battery of a mobile device, the wireless charger comprising: a housing configured to be coupled to a source of electrical energy, for receiving electrical energy the source of electrical energy and for converting at least a portion of the electrical energy to radiated electrical energy; a USB connector mounted directly to housing and configured to be plugged into an electrical socket of said source of electrical energy; and at least one magnet embedded or affixed to the housing and configured to magnetically attract ferromagnetic material associated with mobile device, to hold and support said mobile device on or to a support surface of said housing.

Preferably, the USB plug is pivotably mounted to the housing with a pivot coupling. The pivot coupling has a horizontally extending pivot axis that lies in a plane containing a length and width dimension or a diametrical dimension of the housing. The housing includes a well for the storage the USB plug therein. The well is defined on a side of the housing where a resting surface for the mobile device is located.

The wireless charger includes an indicator light configured to indicate that the mobile device is being charged. The housing has a generally flat shape with a thickness dimension that measures less than ¼ corresponding dimensions associated with a length, width and/or diametrical dimensions of said housing. The pivot coupling has a vertical pivot axis that extends along a thickness dimension of the housing.

In another embodiment, there is included a well for the storage of the USB plug, wherein the USB plug is capable of being stored in the well by being pivoted around the vertical pivot axis into and out of the well. The USB pivot coupling is configured to hold the housing suspended in the air while being held solely by said USB plug while the plug is inserted into said electrical socket. The housing has a substantially square-shape or rectangular shape body. The housing includes a hole for securing in the hole a keychain ring or a holding string.

The at least one magnet comprises a plurality of discrete magnets. The plurality of discrete magnets includes a plurality of button magnets located adjacent corner regions of said housing and the plurality of magnets extend along a thickness dimension of said housing.

Other features and advantages of the present invention will become apparent from the following description of the charging cable according to the present disclosure, which refers to the accompanying drawings.

DETAILED DESCRIPTION OF PREFERRED EMBODIMENTS OF THE INVENTION

Figure 1:
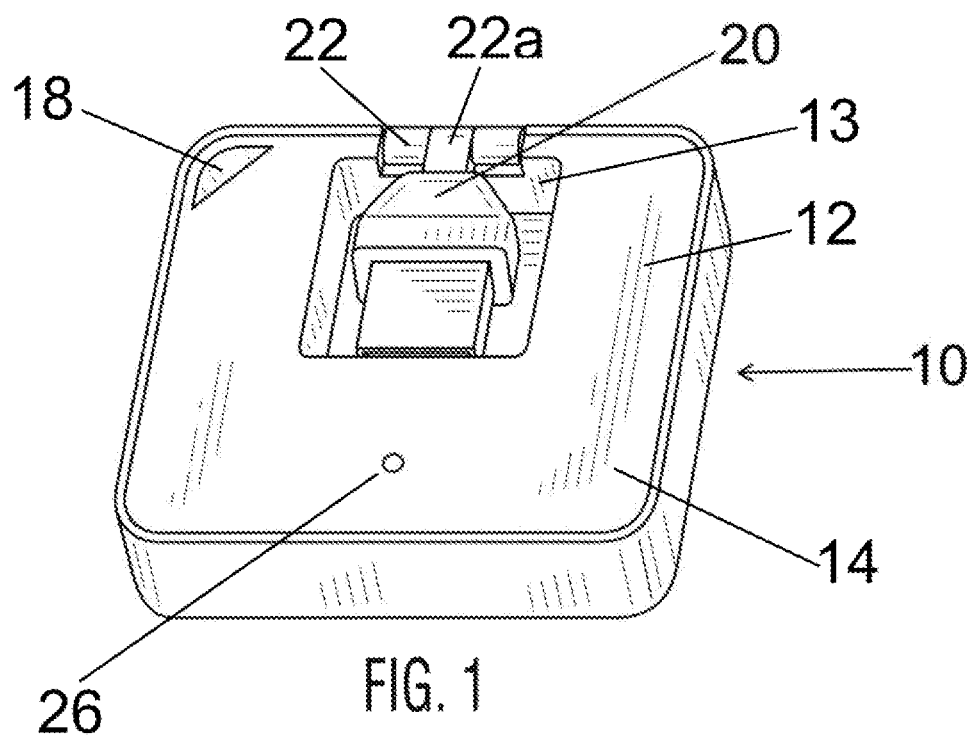
FIG. 1 is a perspective of an embodiment of the invention.
Figure 2:
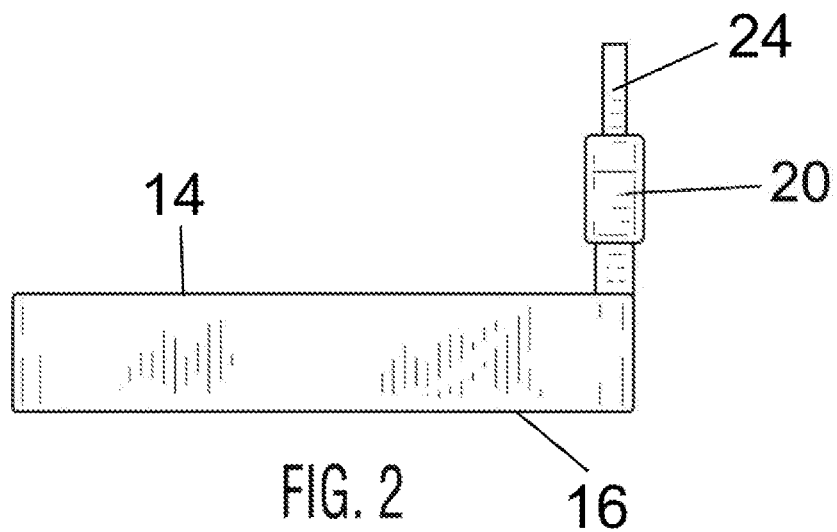
FIGS. 2, 3, 4 and 5 show various views thereof.
Figure 3:
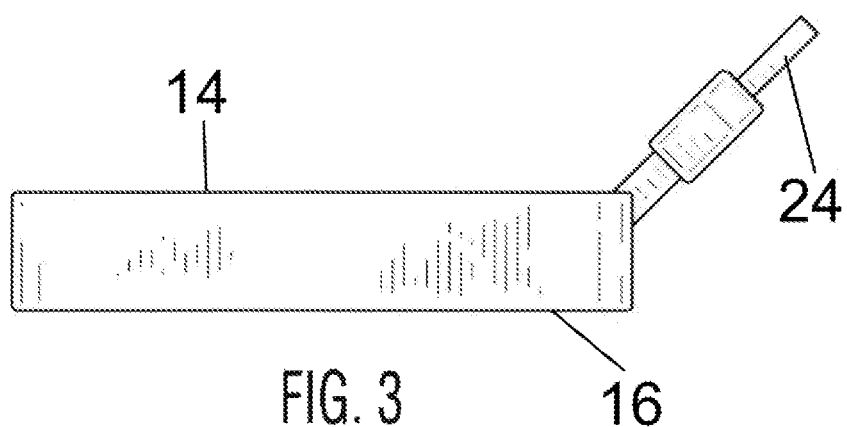
Figure 4:
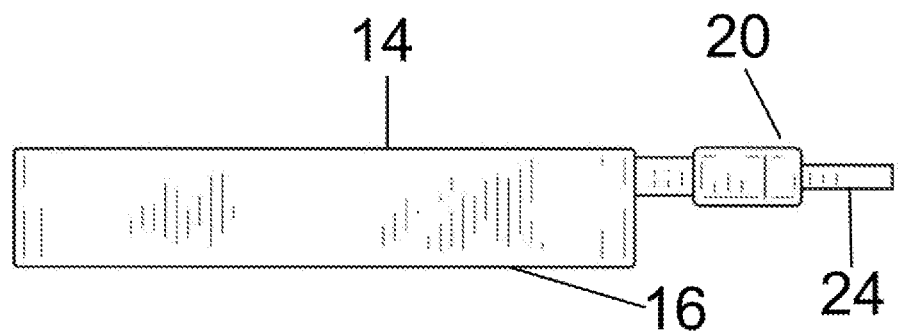
Figure 7:
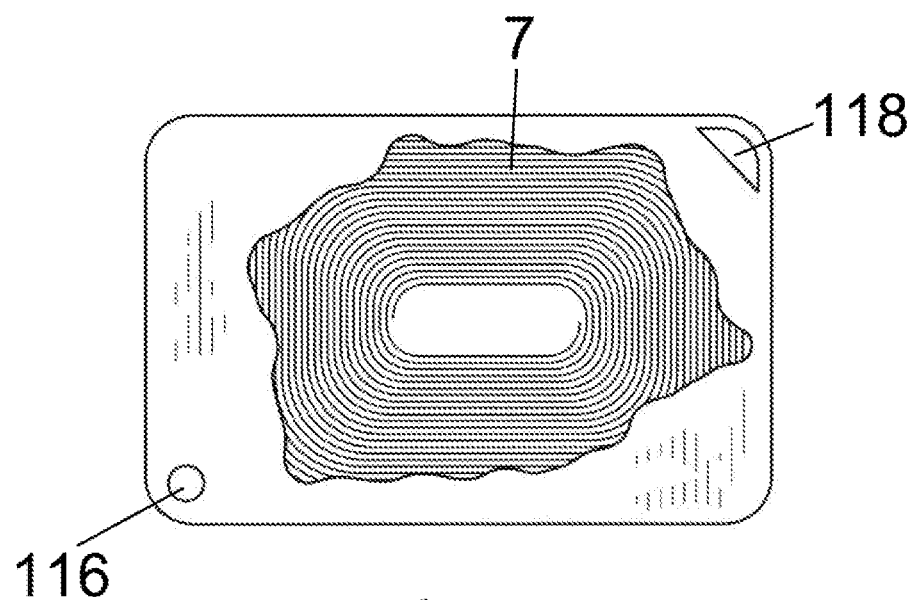
FIG. 7 is a further view thereof.
Figure 8:
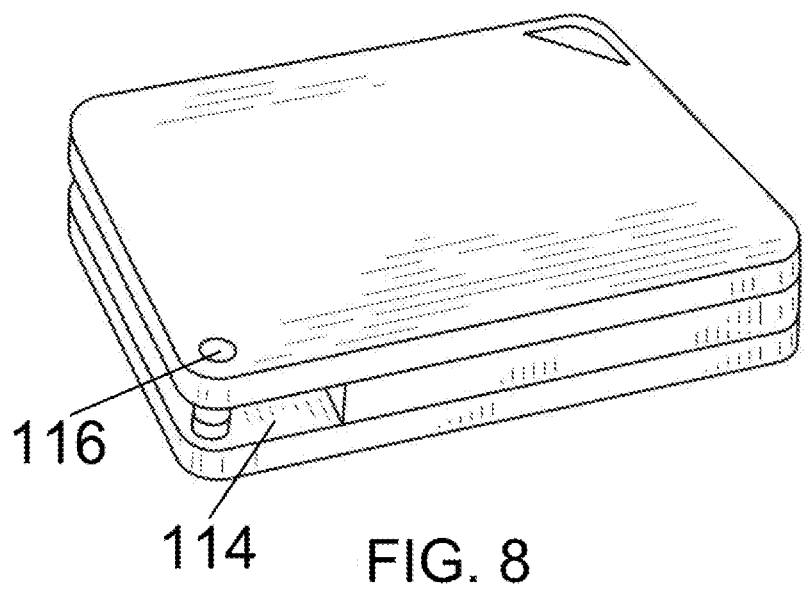
FIGS. 8 and 9 are perspective and partially cut-away views of the device of the present invention according to a second embodiment thereof.
Figure 9:
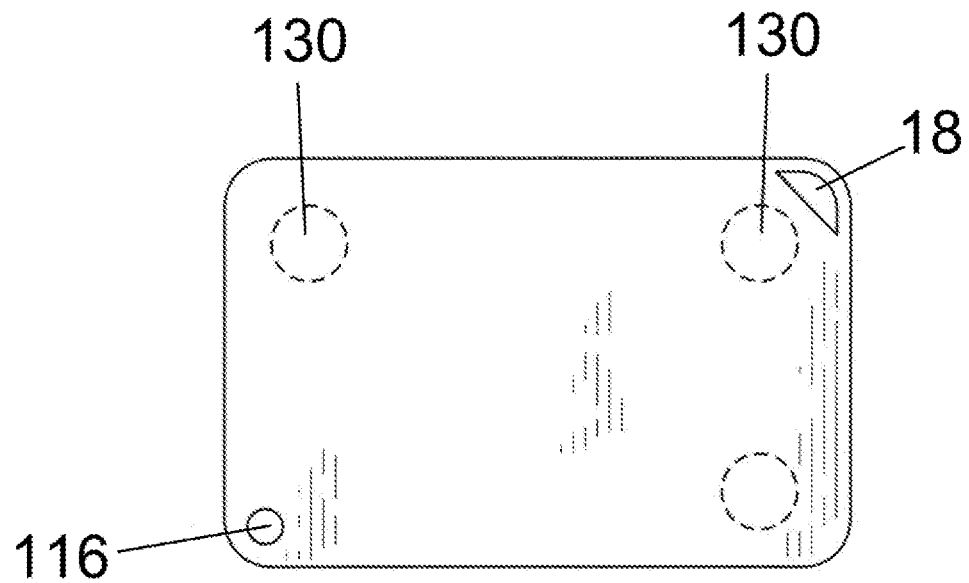

In accordance with a first embodiment of the present invention, the Qi charger 10 shown in FIG. 1 has a general rectangular or even square shaped housing 12 in which the necessary coils 7 (FIG. 7) for transferring power by induction are located. The charger 10 includes a pivotable USB connector 20 that is shown in accordance with the first embodiment thereof in FIGS. 2, 3, and 4. The USB connector 20 pivots in and out of the storage well 13 defined in the housing 12, which has an upper surface 14 for the resting thereon of a mobile device (not shown) during charging. The LED 26 lights when charge is being transferred to the mobile device.

In a typical application, the plug 24 of the USB connector 20 of the Qi charger is inserted into conventional charger power source, for example, the automobile USB charger porter or a home phone charger that plugs into an AC socket. When connected, the power from the charger is transmitted to the body of the Qi charger and thereafter is inductively coupled and transferred into the mobile device, e.g., telephone, when the telephone is magnetically adhered to the surface 14 of the housing 12. To do so, the mobile device (not shown) must incorporate ferromagnetic material, typically in sheet form that is stored in the phone's case or adhered to the back side of the phone.

Figure 5:
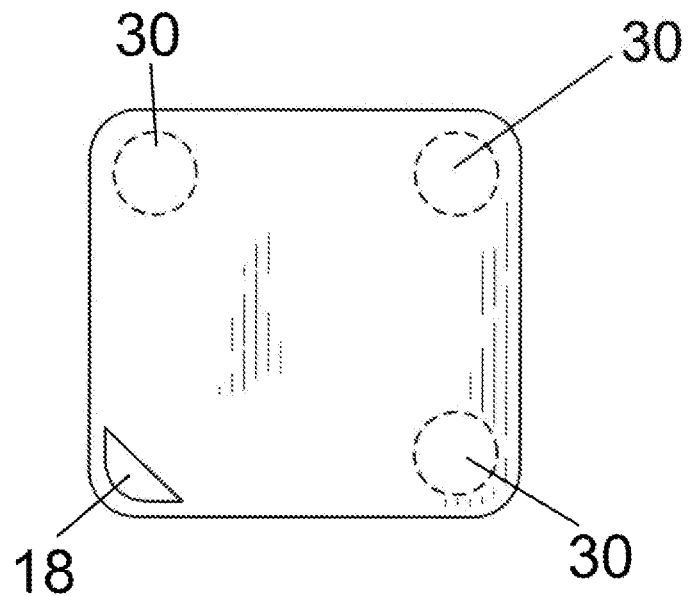
Figure 6:
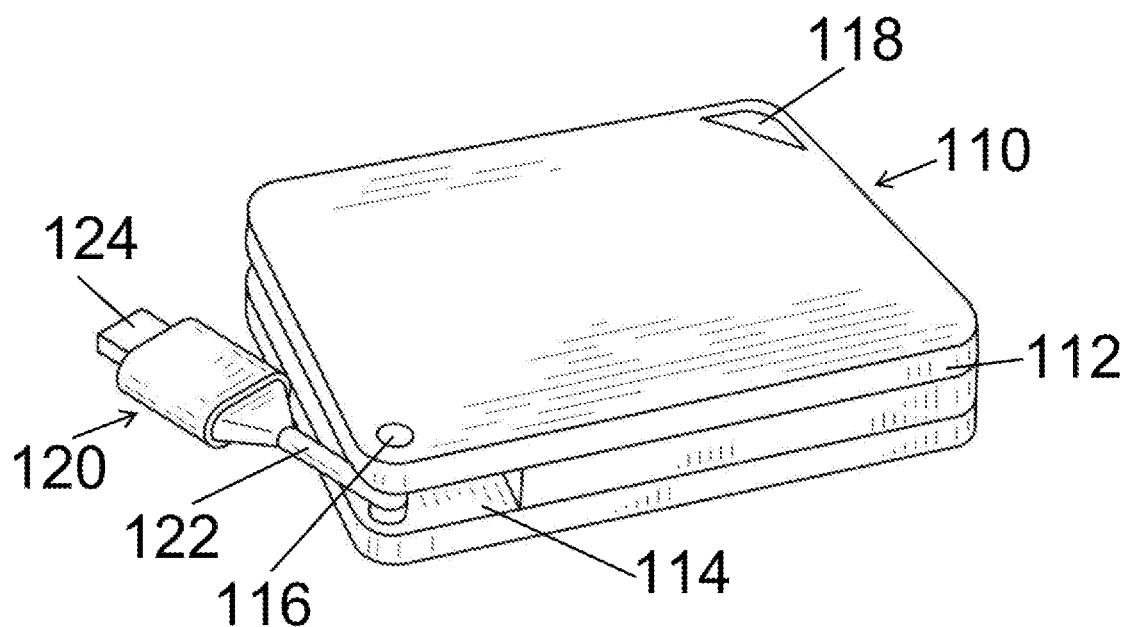
FIG. 6 is a further view of a first embodiment of the invention.

Compared conventional chargers, the footprint dimension of the Qi charger 10, defined by its bottom surface 16, is smaller than conventional similar chargers that are presently on the market. To hold the phone to the top 14 of the charger 10, even when the charger 10 is oriented other than horizontally, there are several button-shaped magnets 30 (shown in dashed lines in FIG. 5) that magnetically attract and thus hold onto the back of a telephone that has the aforementioned ferromagnetic material or sheet attached thereto.

The overall invention therefore enables a telephone to be magnetically adhered to the Qi charger by being placed against the Qi charger, which, charger is, in turn, inserted in either an automobile charger or a home-based charger in a well-known manner, without any use of any dangling cables and the like. The charger 10 also includes a through-going hole 18 in one of its corners through which a key ring or the like can be threaded for easy carrying of the charger 10 on key chain.

In accordance with one concept of the present invention, the USB hinge 22 can incorporate serrations between the center portion 22a and the abutting surfaces to allow or provide a ratcheting action adjustment of the body 12 relative to the USB connector. Thereby, inserting the USB plug 20 into an automobile charger permits the charger body to also act as a support for the phone, holding it at a desired angle for better viewing and the like.

The embodiment of the invention shown in FIGS. 6-9 is generally similar to and provides the same functions as the first embodiment, except that in this embodiment the USB connector 120 having the plug 124 includes a support bar that rotates around the hinge 116, enabling the USB connector 120 to be stored into or retrieved from the compartment 114, so it is generally invisible when not used during charging cycles.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wireless charger for charging a battery of a mobile device, the wireless charger comprising:
   a housing configured to be coupled to a source of electrical energy, for receiving electrical energy the source of electrical energy and for converting at least a portion of the electrical energy to radiated electrical energy;
   a USB connector mounted directly to the housing and configured to be plugged into an electrical socket of said source of electrical energy;
   at least one magnet embedded or affixed to the housing and configured to magnetically attract ferromagnetic material associated with mobile device, to hold and support said mobile device on or to a support surface of said housing; and
   wherein the USB plug has a first end that is pivotably mounted, via a pivot coupling, to the housing at an edge of the housing and a juxtaposed, opposite end an electrical mail plug configured to be plugged into said electrical socket in manner that supports said housing while the mobile device remains supported by said housing while said housing is suspend in the air held suspended solely by said USB connector.

2. The wireless charger of claim 1, wherein the pivot coupling has a horizontally extending pivot axis that lies in a plane containing a length and width dimension or a diametrical dimension of the housing.

3. The wireless charger of claim 1, the housing including a well for the storage the USB plug therein.

4. The wireless charger of claim 3, wherein the well is defined on a side of the housing where a resting surface for the mobile device is located.

5. The wireless charger of claim 1, including an indicator light configured to indicate that the mobile device is being charged.

6. The wireless charger of claim 1, wherein the housing has a generally flat shape with a thickness dimension that measures less than ¼ corresponding dimensions associated with a length, width and/or diametrical dimensions of said housing.

7. The wireless charger of claim 1, where in the pivot coupling has a vertical pivot axis that extends along a thickness dimension of the housing.

8. The wireless charger of claim 7, including a well for the storage of the USB plug, wherein the USB plug is capable of being stored in the well by being pivoted around the vertical pivot axis into and out of the well.

9. The wireless charger of claim 1, wherein the housing has a substantially square-shape or rectangular shape body.

10. The wireless charger of claim 1, including a hole for securing in the hole a keychain ring or a holding string.

11. The wireless charger of claim 1, wherein said at least one magnet comprises a plurality of discrete magnets.

12. The wireless charger of claim 11, wherein the plurality of discrete magnets includes a plurality of button magnets located adjacent corner regions of said housing.

13. The wireless charger of claim 12, wherein said plurality of magnets extend along a thickness dimension of said housing.

14. The wireless charger of claim 1, wherein the pivot coupling includes ratcheting serrations that enable fixing an orientation of the housing relative to the mail plug at a desired angle.

\* \* \* \* \*